(12) United States Patent
Allen (10) Patent No.: US 6,966,143 B2
(45) Date of Patent: Nov. 22, 2005

(54) INJECTION PLUG ASSEMBLY

(76) Inventor: George R Allen, 374 Main St., Gloucester, MA (US) 01930

( * ) Notice: Subject to any disclaimer, the term of this patent is extended or adjusted under 35 U.S.C. 154(b) by 194 days.

(21) Appl. No.: 10/691,798

(22) Filed: Oct. 23, 2003

(65) Prior Publication Data

US 2005/0055871 A1    Mar. 17, 2005

Related U.S. Application Data

(63) Continuation-in-part of application No. 10/661,441, filed on Sep. 15, 2003.

(51) Int. Cl.[7] .............................................. A01M 13/00
(52) U.S. Cl. ...................................... 43/124; 239/271
(58) Field of Search ................ 43/124, 132.1; 239/271, 272

(56) References Cited

U.S. PATENT DOCUMENTS

| | | | | |
|---|---|---|---|---|
| 1,401,292 A | * | 12/1921 | Van Meter | 424/40 |
| 2,779,065 A | | 1/1957 | Rehme | |
| 3,774,556 A | * | 11/1973 | Poll | 111/7.2 |
| 4,756,118 A | * | 7/1988 | Evans, II | 43/132.1 |
| 4,823,505 A | | 4/1989 | Jackson | |
| 5,058,312 A | * | 10/1991 | Jackson | 43/124 |
| 5,058,313 A | * | 10/1991 | Tallon | 43/124 |
| 5,309,669 A | | 5/1994 | Jackson | |
| 5,319,878 A | * | 6/1994 | Moffett et al. | 43/124 |
| 5,361,533 A | * | 11/1994 | Pepper | 43/124 |
| 5,390,440 A | * | 2/1995 | Mihealsick | 43/124 |
| 5,542,207 A | * | 8/1996 | Morris, Sr. | 43/132.1 |
| 5,678,352 A | * | 10/1997 | Leitner et al. | 43/125 |
| 5,860,243 A | * | 1/1999 | Stager | 43/124 |
| 5,870,852 A | * | 2/1999 | Stanley | 43/130 |
| 5,881,493 A | * | 3/1999 | Restive | 43/124 |
| 5,937,572 A | * | 8/1999 | Neumann | 43/132.1 |
| 6,301,849 B1 | | 10/2001 | Roth | |
| 6,446,383 B1 | * | 9/2002 | Hoshall | 43/124 |
| 6,463,694 B1 | * | 10/2002 | Manciet | 43/124 |

FOREIGN PATENT DOCUMENTS

| | | | | | |
|---|---|---|---|---|---|
| GB | 2257357 A | * | 1/1993 | | A62C 31/22 |
| NL | 0549065 A1 | * | 12/1992 | | A01M 21/04 |

* cited by examiner

Primary Examiner—Peter M. Poon
Assistant Examiner—Bethany L. Griles
(74) Attorney, Agent, or Firm—Don Halgren (57) ABSTRACT

A injection plug assembly for insertion internally into a walled structure to permit safe access to and wide distribution of a fluid, liquid or powder spray into that walled structure. The assembly comprises an elongated outer sleeve arranged to pinch any thickness wall structure and an elongated delivery bolt arranged to be received through the outer sleeve. The elongated bolt has a radially directed fluid distribution channel therein.

15 Claims, 7 Drawing Sheets

INJECTION PLUG ASSEMBLY

This is a continuation in part of my co-pending U.S. patent application Ser. No. 10/661,441, filed 15 Sep. 2003, and incorporated herein by reference in its entirety.

BACKGROUND OF THE INVENTION

1. Field of the Invention

This invention relates to arrangements which permit the safe and controlled introduction of a liquid, a foam or a powder spray into the interior spaces of a building, such as its walls, columns or posts, for bug extermination purposes or for the introduction of preservatives into that interior space.

2. Prior Art

Insect infestation in buildings is common all around the world. Such buildings may be homes, commercial buildings, or industrial buildings. The problem is more acute, in certain areas where the climate is warm and humid.

Typical methods of exterminating such insect infestation typically comprise of spraying the perimeters of a room or of the building, inside or outside, with an insecticide, or using a fogging apparatus, all of which methods are only temporary and have limited effectiveness.

Application of those insecticides are preferable when they are introduced into the spaces within the walls themselves so as to get at the hives and colonies where those insects reside. A number of attempts at such fumigation may be seen in the prior art, which however, all appear to have certain drawbacks. U.S. Pat. No. 4,823,505 to Jackson shows a fumigation system for a building in which a tunnel device is inserted through a wall. This tunnel device, however, has barbs which engage the wall to secure the device in place. Such barbs, however, often will work loose within the wall or enlarge the opening so as to make the tunnel device loose and improper.

U.S. Pat. No. 5,058,312 to Jackson shows a further extermination system utilizing a plug which is inserted into a wall. Such plug system again includes some tapered barbs which may work loose from the wall or wear the wall out where it should not. The same is true in a further patent to Jackson, U.S. Pat. No. 5,309,669 showing another extermination system which is left open after the insecticide has been installed in the wall, and which plug utilizes those barbs which typically loosen or disarrange the wall.

U.S. Pat. No. 5,542,207 to Morris, Senior, shows a process for controlling insect infestations in a building. Such process is a rather complicated arrangement of multi tubular nozzles arranged to insert an insecticide into a plurality of holes simultaneously onto a building wall. There is no arrangement for covering those holes after the process has been completed.

U.S. Pat. No. 5,361,533 to Pepper shows a device for injecting a pesticide into a wall area. The device, however, is attached to an opening in that wall, merely by double-sided tape. Fixtures like that don't typically last very long or work very well. Such tape could become loosened by the application of the insecticide itself.

It is an object of the present invention to overcome the disadvantages of the prior art.

It is a further object of the present invention to provide an insecticide assembly for a walled structure which may be securely set therewithin, and reusable.

It is still yet a further object of the present invention to provide an insecticide introduction assembly for a wall structure which may be sealed to prevent insecticide escape and to minimize the likelihood of anyone misusing such an assembly, particularly young children.

It is still yet a further object of the present invention to provide an insecticide introducible assembly for a wall structure which will adapt itself to any wall thickness during the introduction of that assembly into the wall.

BRIEF SUMMARY OF THE INVENTION

The injection assembly of the present invention comprises an elongated hollow receiving sleeve, having a first or proximal end, and a second or distal end. The first or proximal end has an annular flange extending radially outwardly thereof. The proximal flange is unitarily attached to an annular housing. The annular housing has an opening of a first diameter extending therethrough. A thin walled shell extends distally of the annular housing. The shell has a bore extending therethrough of a diameter of a second diameter which is greater than the first diameter of the bore of the annular housing. The cylindrical shell has a plurality of generally diamond-shaped cutouts extending circumferentially therearound, so as to create a plurality of circumferentially spaced tapered fingers having an apex which defines a knuckle, and a second set of circumferentially spaced fingers having a taper providing a second set of circumferentially-spaced fingers, which is unitary with a distalmost annular housing of the receiving sleeve. The distalmost annular housing has a threaded surface therewithin of a third diameter.

A slot is cut into the cylindrical sleeve at the proximalmost end of the diamond-shape cutout to facilitate size accommodations of the receiving sleeve discussed herebelow.

Each pair of longitudinally aligned tapered fingers are connected by a knuckle joint at their respective apexes. Each knuckle has a slight radially outwardly projecting bulge therein.

The injection assembly also includes a threaded delivery bolt having a central bore extending therethrough. The delivery bolt has a proximal end with an enlarged annular head thereon. A shank is arranged unitary with the head. The balance of the distal portion of the elongated delivery bolt is threaded externally. A plurality of radially directed discharge ports are arranged distally adjacent the distal cap on the distal end of the delivery bolt. The radial discharge ports are in fluid communication with the boar extending through the delivery bolt. The diameter of the threaded portion of the delivery bolt is equivalent to the third diameter existing on the internal threaded surface of the distal annular housing of the receiving sleeve. The externally threaded delivery bolt is arranged so as to be slidably received within the annular housing and body portion of the receiving sleeve. The threads of the delivery bolt are sized so as to engage the internal threads on the distalmost end of the distal annular housing of the receiving sleeve.

In use of the injection assembly of the present invention, a hole is drilled into a dry wall or inner wall of the building structure so as to permit the receiving sleeve to be inserted therein, up to the proximal flange on the proximal end of that receiving sleeve. The threaded delivery bolt is then slidably inserted into the receiving sleeve so that the distal threads on the distal end of the threaded delivery bolt engage the internal threads on the distal annular housing portion of the receiving sleeve. Clockwise rotation of the delivery bolt will then threadably engage the internal threads at the distal end of the receiving sleeve and begin its compression relative to the bolt and relative to the wall in which it is inserted.

Longitudinally adjacent fingers on the receiving sleeve begin to deform at the knuckles therebetween, the proximalmost array of fingers bending adjacent their proximalmost slots, so as to snuggly engage the inside surface of the wall structure in which the assembly has been inserted. Those elongated slots adjacent the proximal portion of the diamond-shaped cutouts permits the distortable fingers to accommodate any thickness wall in which the assembly is inserted. Continued rotation of the delivery bolt within the receiving sleeve effects the continued collapse of the longitudinally adjacent fingers onto one another so as to snuggly affix the receiving sleeve and delivery bolt into the wall to which it has been inserted.

The distal cap, on the distalmost end of the delivery bolt, pushes away any debris or wall material which may otherwise exist, as that delivery bolt is inserted into the wall and as the distal annular housing is caused to be pulled towards the inside surface of the walled structure.

In use of the present invention, the nozzle of a pressurized injector spray may be inserted within the proximal opening in the receiving sleeve, and a spray or aerosol may be injected through the bore therewithin. Such spray may be delivered radially outwardly from the distal end of the delivery bolt by virtue of the radially directed ports in fluid communication with the central bore of the delivery bolt. Thus, an insecticide or a preservative spray of gas, liquid, foam or a powder may be radially directed into the internal space of a wall, post or column of a structure, which spray is unhindered by debris or wall material, because of the plowing effect of the distal cap on the distal end of the delivery bolt. The collapse of the circumferential array of longitudinally tapered fingers permits a permanent snug engagement of the injection assembly onto the wall structure.

The injection assembly of the present invention includes a generally hemispherically-shaped mushroom cap, which is inserted into the central drive or shaped bore at the proximal end of the delivery bolt. The mushroom cap preferably has an annular flange which mates around the outer periphery of the head of the delivery bolt. A further embodiment of the mushroom cap includes a threaded bore extending partway into the mushroom cap and in a longitudinal alignment therewith. Such a threaded boar is utilized to permit a threadable tool to be inserted therein for safe and easy removal of that mushroom cap from the injection assembly.

The invention thus comprises a injection plug assembly for insertion into an internal portion of wall or post structure or the like, to permit safe access to and wide distribution of a fluid spray into the wall structure. The assembly comprises an elongated outer sleeve arranged to pinch any thickness wall structure and an elongated delivery bolt arranged to be received through the outer sleeve, the elongated bolt having a radially directed fluid distribution channel therein. The elongated delivery bolt has a bore arranged therethrough for delivery of a gas, liquid, foam or like fluid therefrom. The elongated delivery bolt may have a cap on a distalmost end thereof. The cap may be removable. The bolt preferably has a plurality of radially directed openings on its distalmost end to permit sideways directed fluid discharge therefrom. The elongated sleeve has a circumferential array of longitudinally directed pairs of fingers therearound, to permit the pinching of the assembly to a wall structure. A slot may be arranged in a proximal end of the sleeve between circumferentially adjacent fingers, to permit adaptability of the assembly to any thickness wall during an attachment process. The pairs of fingers preferably have a bendable knuckle therebetween. The fingers in the pairs of fingers are arranged to collapse on one another when an elongated bolt is threaded through the sleeve. The elongated bolt has a proximal end with an enlarged head thereon, the bolt and said the pinching a wall between the enlarged head on the bolt and the fingers as the fingers are bent.

A removable end cap may be insertable into the enlarged head on the proximal end of the bolt. The removable cap has a threaded bore extending axially therein, to permit a tool to be inserted into the cap for safe removal of the cap from the bolt. The removable cap may have a flanged rim for sealed engagement of the enlarged head on the proximal end of the bolt.

The invention may also include a method of introducing a gas, liquid, powder or fluid spray into the inside of a walled structure, comprising one or more of the steps of: drilling a hole into the structure; inserting a collapsable, elongated, fingered sleeve into the hole in the wall structure; threading a hollow elongated delivery bolt into the sleeve; pinching the wall tightly between a head of the bolt and a finger of the sleeve; injecting a fluid spray into the hollow elongated delivery bolt for introduction of the spray fluid into the wall structure. The method may also include: inserting a removable end cap onto a distal end of the elongated bolt to permit the bolt to push away wall debris during its being threaded through the sleeve; arranging a plurality of radially directed openings on the distal end of the bolt to permit the fluid to be sprayed radially from the distal end of the delivery bolt.

BRIEF DESCRIPTION OF THE DRAWINGS

The objects and advantages of the present invention will become more apparent when viewed in conjunction with the following drawings in which.

DETAILED DESCRIPTION OF THE PREFERRED EMBODIMENTS

Figure 1:
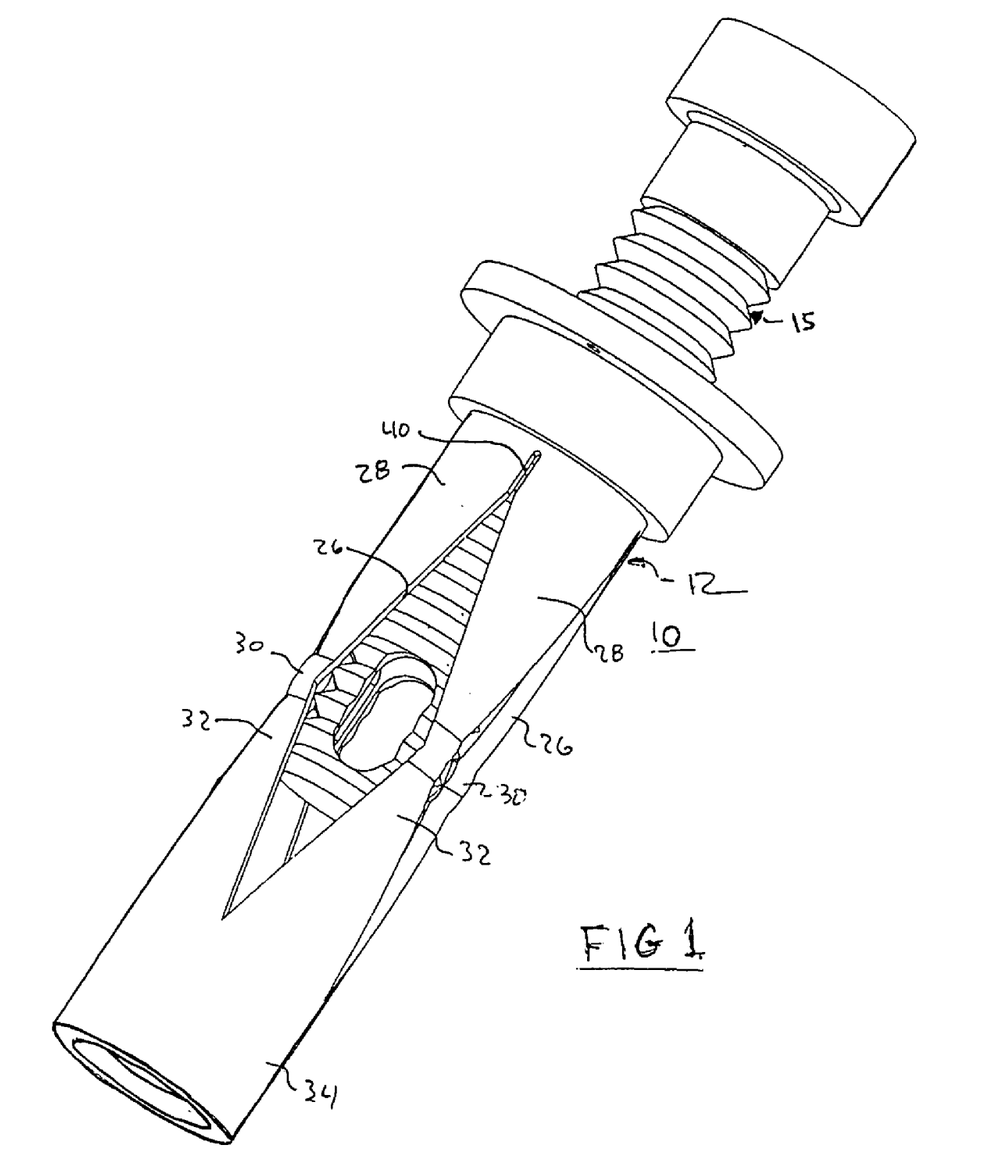
FIG. 1 is a perspective view of a receiving sleeve partially engaging a delivery bolt which comprise the injection plug assembly.

Referring now to the drawings in detail, and particularly to FIG. 1, there is shown the present invention which comprises an injection plug assembly 10. The injection plug assembly 10 comprises an elongated hollow receiving sleeve 12, shown separately in FIG. 1A, and a delivery bolt 15, shown separately in FIG. 2. The receiving sleeve 12, in FIG. 1A, has a first or proximal end 14, and a second or distal end 16. The first or proximal end 14 of the sleeve 12 has an annular flange 18 extending radially outwardly thereof. The proximal flange 18 is unitarily attached to an annular housing 20. The annular housing 20 has an opening of a first diameter d1 extending therethrough, as may be seen in FIG.

3. A thin walled shell 22 extends distally of the annular housing 20, as best seen in FIG. 1A.

The shell 22 has a bore 24 extending therethrough of a second diameter d2 which is greater than the first diameter d1 of the bore d1 of the annular housing 20. The cylindrical shell 22 has a plurality of generally diamond-shaped cutouts 26 extending circumferentially therearound, as may be seen in FIGS. 1 and 1A, so as to create a plurality of circumferentially spaced tapered fingers 28 having an apex which defines a knuckle 30, and a second set of circumferentially spaced fingers 32 having a taper, which second set of fingers 32 is unitary with a distalmost annular housing 34 of the receiving sleeve 12. The distalmost annular housing 34 has a threaded surface 36 therewithin of a third diameter d3.

Figure 1A:
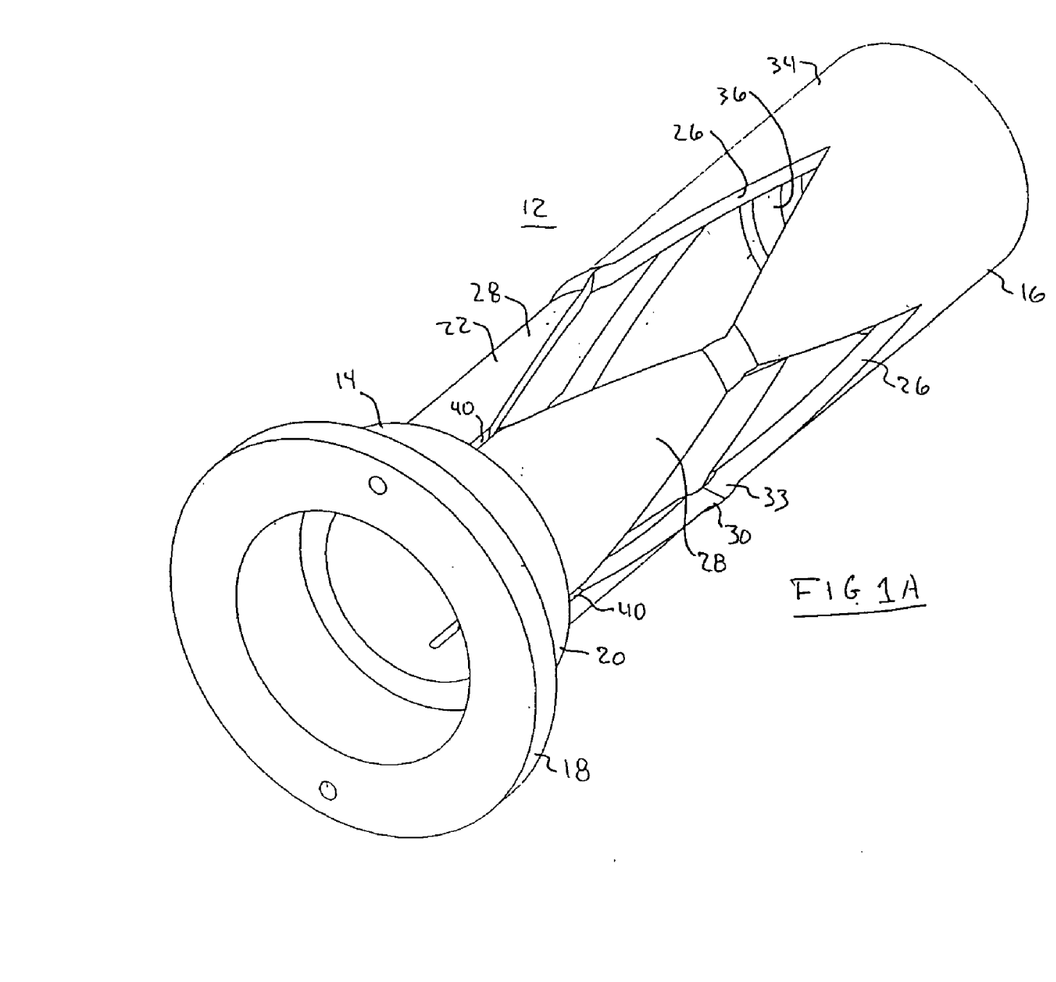
FIG. 1A is a perspective view of a receiving sleeve utilized with the present invention.
Figure 3:
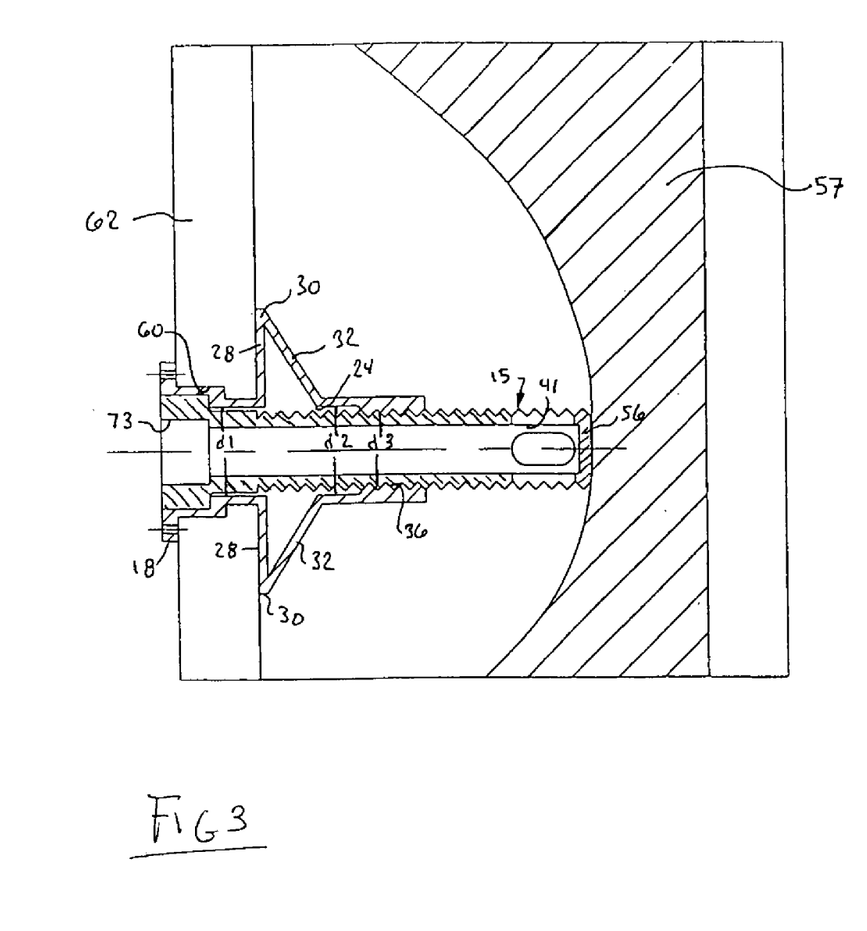
FIG. 3 is a side elevational view of an injection assembly comprising a receiving sleeve within a wall structure and the elongated delivery bolt extending therethrough.
Figure 4:
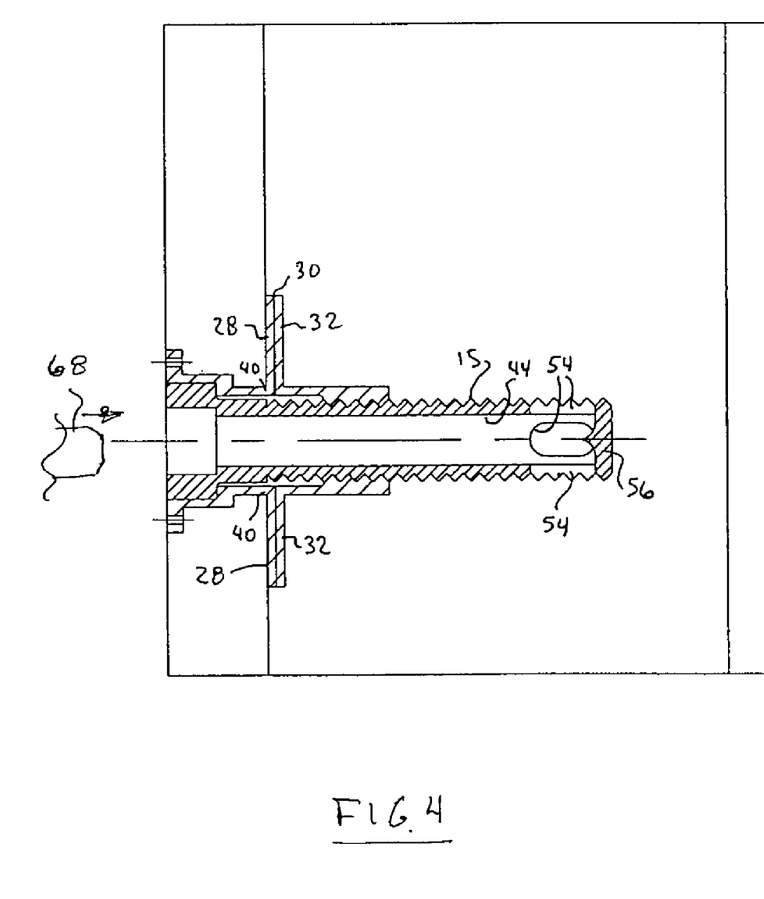
FIG. 4 is a view similar to FIG. 3, with the receiving sleeve fully engaging the delivery bolt in a completely collapsed configuration snuggly engaging the wall of the structure.

A slot 40 is cut into the cylindrical sleeve at the proximalmost end of each diamond-shape cutout 26, as shown in FIGS. 1 and 1A, to facilitate wall thickness accommodations of the receiving sleeve 12, as shown in FIGS. 3 and 4, and discussed herebelow.

Each pair of longitudinally aligned tapered fingers 28 and 32 are connected by the knuckle joint 30 at their respective apexes as shown in FIGS. 1 and 1A. Each knuckle 30 has a slight radially outwardly projecting bulge 33 therein to facilitate bending thereat.

Figure 2:
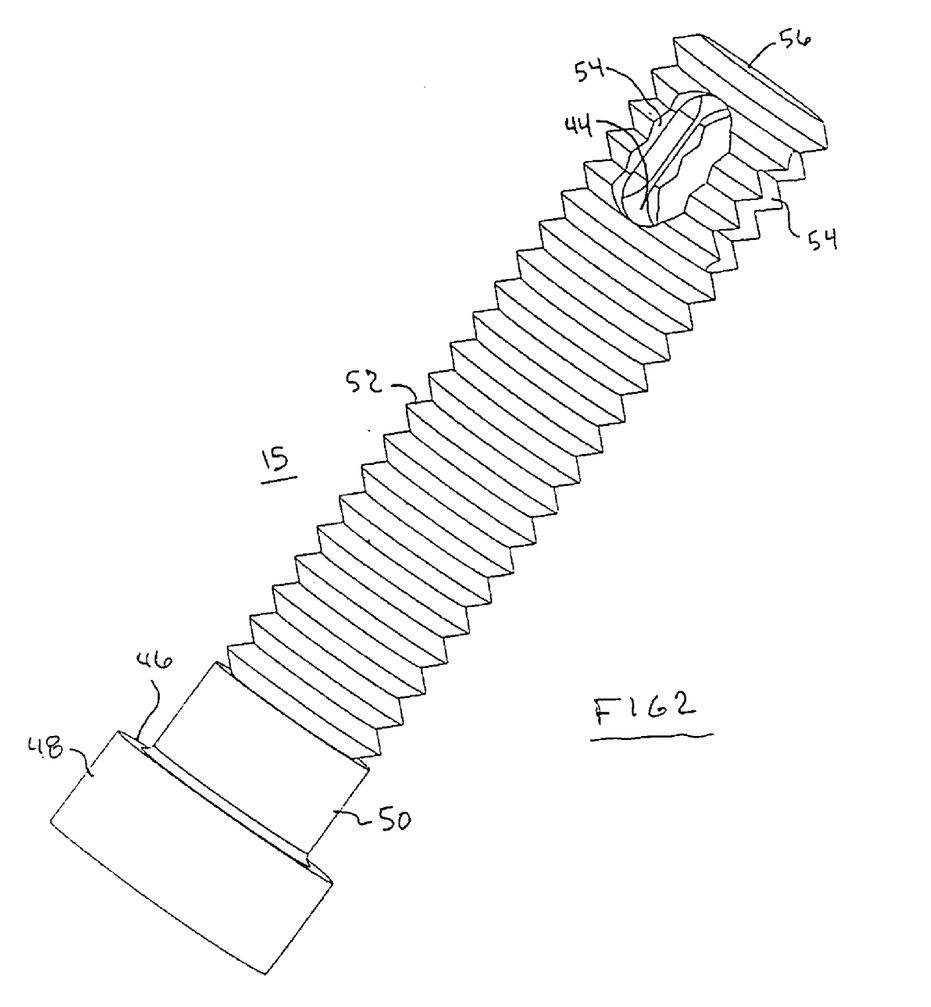
FIG. 2 is a perspective view of the threaded delivery bolt component of the present invention.

The injection plug assembly 10 also includes the threaded delivery bolt 15, shown in FIGS. 1 and 2. The delivery bolt 15 has a central bore 44 extending therethrough, as best seen in FIGS. 3 and 4. The delivery bolt 15 has a proximal end 46 with an enlarged annular head 48 thereon. A shank 50 is arranged unitary with the head 48. The balance of the distal portion of the elongated delivery bolt 15 has an external thread 52 thereon, as shown best in FIG. 2. A plurality of radially directed discharge ports 54 are arranged adjacent a distal cap 56 on the distal end of the delivery bolt 15. The radial discharge ports 54 are in fluid communication with the bore 44 extending through the delivery bolt 15. The diameter of the threaded portion 52 of the delivery bolt 15 is equivalent to the third diameter d3 existing on the internal threaded surface 36 of the distal annular housing 34 of the receiving sleeve 12. The externally threaded delivery bolt 15 is arranged so as to be slidably received within the annular housing 20 and body portion 22 of the receiving sleeve 12. The threads 52 of the delivery bolt 15 are sized so as to engage the internal threads 36 on the distalmost end 34 of the distal annular housing 34 of the receiving sleeve 12.

Figure 2A:
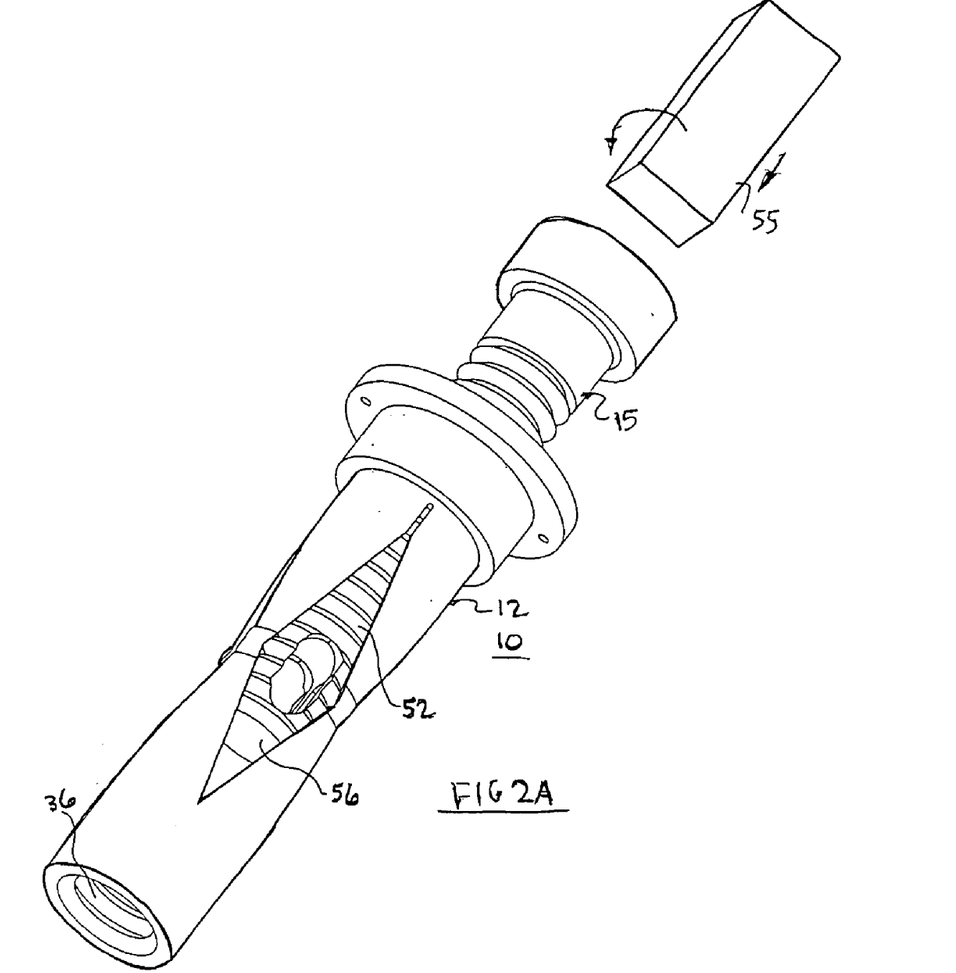
FIG. 2A is a perspective view of the threaded delivery bolt receiving a drive tool.

In use of the injection plug assembly 10 of the present invention, a hole 60 is drilled into a dry wall or inner wall 62 of the building structure so as to permit the receiving sleeve 12 to be inserted therein, up to the proximal flange 18 on the proximal end 14 of that receiving sleeve 12, as shown in FIGS. 3 and 4. The threaded delivery bolt 15 is then slidably inserted into the receiving sleeve 12 so that the distal threads 52 on the distal end of the threaded delivery bolt 15 engage the internal threads 36 on the distal annular housing portion 34 of the receiving sleeve 12. Clockwise rotation of the delivery bolt by a drive tool 55, as represented in FIG. 2A will then threadably engage the internal threads 36 at the distal end of the receiving sleeve 12 and begin its compression relative to the bolt 12 and relative to the wall 62 in which it is inserted. The circumferential array of longitudinally adjacent fingers 28 and 32 on the receiving sleeve 12 begin to deform at the respective knuckles 30 therebetween, as represented in FIG. 3, the proximalmost circumferential array of fingers 28 bending adjacent their proximalmost slots 40, so as to snuggly engage the inside surface of the wall structure 62 in which the injection plug assembly 10 has been inserted, as represented in FIG. 4.

Those elongated slots 40 adjacent the proximal portion of the diamond-shaped cutouts 26 permits the distortable fingers 28 and 32 to accommodate any thickness wall in which the injection plug assembly 10 is inserted. Continued rotation of the delivery bolt within the receiving sleeve 12 effects the continued collapse of the longitudinally adjacent fingers 28 and 32 onto one another so as to snuggly affix the receiving sleeve and delivery bolt 15 into the wall 62 to which it has been inserted.

The distal cap 56, which may be pushably removed from the distalmost end of the delivery bolt 15, itself pushes away any debris, insulation or wall material 57 which may otherwise exist, as that delivery bolt 15 is inserted into the wall and as the distal annular housing 34 is caused to be pulled towards the inside surface of the walled structure 62, as represented in FIG. 3.

In use of the present invention, the nozzle of a pressurized injector spray 68 may be inserted within the proximal opening in the receiving sleeve 12, and a spray or aerosol may be injected through the bore 44 therewithin. Such spray may be delivered radially outwardly from the distal end of the delivery bolt 15 by virtue of the radially directed ports in fluid communication with the central bore 44 of the delivery bolt 15. Thus, an insecticide or a preservative spray of fluid, powder, foam or powder or the like may be generally radially (or angularly, i.e. non-orthogonally) directed into the internal space of a wall of a structure 62, which spray is unhindered by debris, insulation or wall material, because of the plowing effect of the distal cap 56 on the distal end of the delivery bolt 15. The collapse of the circumferential array of longitudinally tapered fingers 28 and 32 permits a permanent snug engagement of the injection plug assembly 10 into the wall structure 62.

Figure 5:
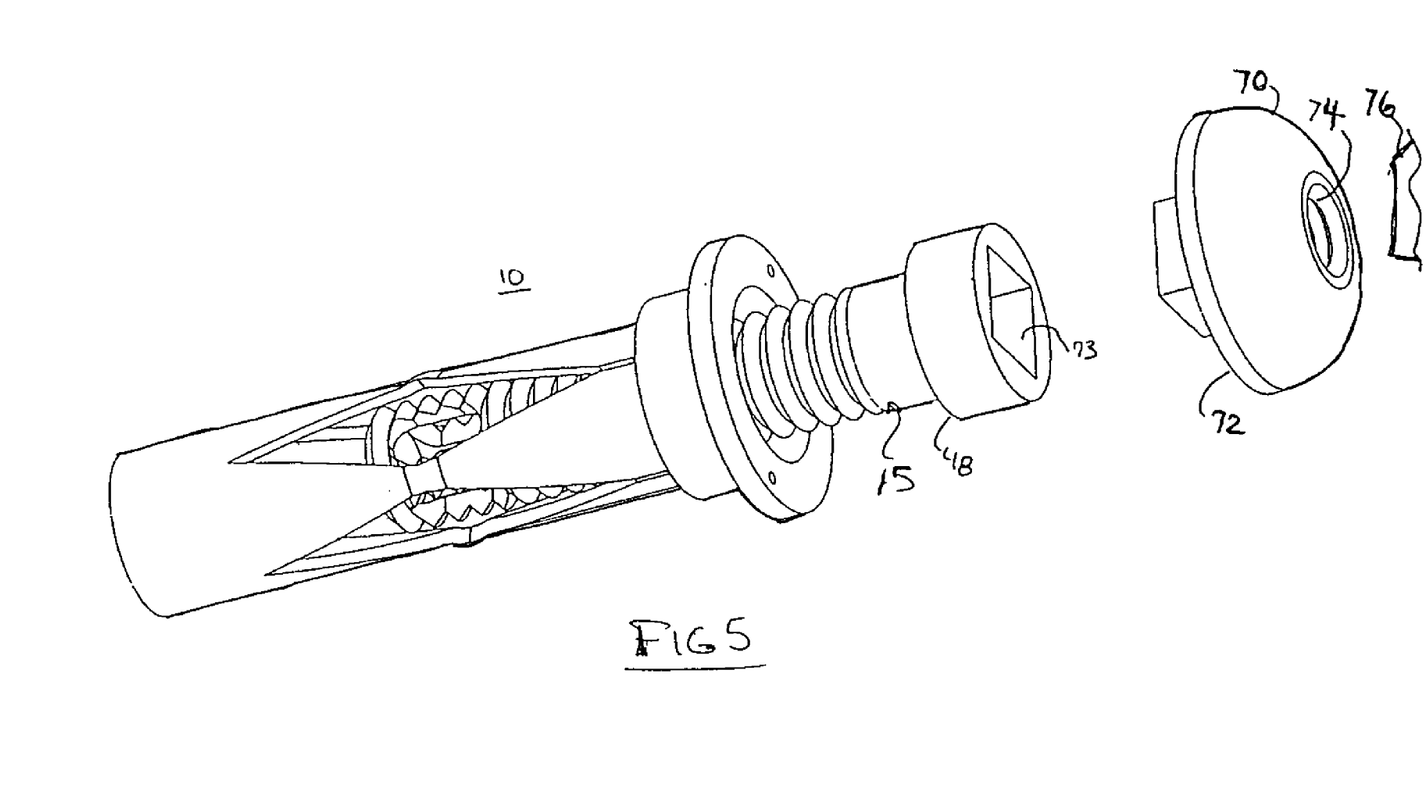
FIG. 5 is a side elevational view in section of a delivery bolt having a mushroom plug cap arranged thereon.

The injection plug assembly 10 of the present invention may include a generally hemispherically-shaped mushroom cap 70, which cap 70 is inserted into a square drive 73 at the proximal end of the delivery bolt 15. as represented in FIG. 5. The mushroom cap 15 preferably has an annular flange 72 which mates around the outer periphery of the head 48 of the delivery bolt 15. A further embodiment of the mushroom cap includes a threaded bore 74 extending partway into the mushroom cap 70 and in a longitudinal alignment therewith. Such a threaded bore 74 is utilized to permit a threadable tool 76 to be inserted therein for safe and easy removal of that mushroom cap 70 from the injection plug assembly 10 needed.

I claim:

1. A injection plug assembly for insertion into a wall structure to permit safe access to and wide distribution of a fluid spray into said wall structure, said assembly comprising:
    an elongated outer sleeve arranged to pinch any thickness wall structure; and
    an elongated, outer sleeve-adjusting, fluid delivery bolt arranged through and permanently received within said outer sleeve, said elongated bolt having a generally radially directed fluid distribution channel adjacent a distal end thereof, wherein a slot is arranged in a proximal end of said sleeve between circumferentially adjacent fingers, to permit adaptability of said assembly to any thickness wall during an attachment process.

2. The injection plug assembly as recited in claim 1, wherein said elongated delivery bolt has a bore arranged therethrough for delivery of fluid therefrom.

3. The injection plug assembly as recited in claim 2, wherein said elongated delivery bolt has a cap on a proximal end thereof.

4. The injection plug assembly as recited in claim 3, wherein said cap is removable.

5. The injection plug assembly as recited in claim 3, wherein said bolt has a plurality of radially directed openings on its distalmost end to permit sideways directed fluid discharge therefrom.

6. The injection plug assembly as recited in claim 1, wherein said elongated sleeve has a circumferential array of longitudinally directed pairs of fingers therearound, to permit said pinching of said assembly to a wall structure.

7. The injection plug assembly as recited in claim 6, wherein said pairs of fingers have a bendable knuckle therebetween.

8. The injection plug assembly as recited in claim 7, wherein of said fingers in said pairs of fingers are arranged to collapse on one another when an elongated bolt is threaded through said sleeve.

9. The injection plug assembly as recited in claim 8, wherein said elongated bolt has a proximal end with an enlarged head thereon, said bolt and said sleeve pinching a wall between said enlarged head on said bolt and said fingers as said fingers are bent.

10. The injection plug assembly as recited in claim 9, including a removable cap which is insertable into said enlarged head on said proximal end of said bolt.

11. The injection plug assembly as recited in claim 10, wherein said removable cap has a threaded bore extending axially therein, to permit a tool to be inserted into said cap for safe removal of said cap from said bolt.

12. The injection plug assembly as recited in claim 10, wherein said removable cap has a flanged rim for sealed engagement of said enlarged head on said proximal end of said bolt.

13. A method of introducing a fluid spray into a wall structure, comprising:
    drilling a hole into said wall structure;
    inserting a collapsable elongated, multi-fingered sleeve into said hole in said wall structure;
    threading a hollow elongated, finger-collapsing delivery bolt into said sleeve;
    collapsing said fingers of said sleeve by said hollow delivery bolt during said threading of said bolt into said sleeve so as to pinch said wall between a head of said bolt and a finger of said sleeve;
    injecting a fluid spray into said hollow elongated delivery bolt for introduction of said spray into said wall structure.

14. The method of claim 13, including:
    inserting a removable end cap onto a distal end of said elongated bolt to permit said bolt to push away insulation and wall debris during its being threaded through said sleeve.

15. The method of claim 13, including:
    arranging a plurality of radially directed openings on said distal end of said bolt to permit said fluid to be sprayed radially from said distal end of said delivery bolt.

* * * * *